(12) United States Patent
Dean

(10) Patent No.: US 7,437,414 B2
(45) Date of Patent: Oct. 14, 2008

(54) STANDARDIZED EMAIL CONSTRUCTION AND SEARCH BASED ON GEOGRAPHIC LOCATION

(76) Inventor: Alan Derek Dean, Tall trees, Hergya Hyll, Orsett, Essex RM16 3JA (GB)

( * ) Notice: Subject to any disclaimer, the term of this patent is extended or adjusted under 35 U.S.C. 154(b) by 592 days.

(21) Appl. No.: 09/815,760

(22) Filed: Mar. 23, 2001

(65) Prior Publication Data

US 2001/0049723 A1    Dec. 6, 2001

(30) Foreign Application Priority Data

Mar. 24, 2000    (GB) .................................. 0007224.9

(51) Int. Cl.
*G06F 15/16*    (2006.01)
*G06F 15/173*    (2006.01)
*G06F 15/177*    (2006.01)

(52) U.S. Cl. ..................... 709/206; 709/224; 709/217

(58) Field of Classification Search ......... 709/200–206, 709/207, 217–228; 715/752
See application file for complete search history.

(56) References Cited

U.S. PATENT DOCUMENTS

| | | | | |
|---|---|---|---|---|
| 5,970,469 A * | 10/1999 | Scroggie et al. ................ | 705/14 |
| 5,987,508 A * | 11/1999 | Agraharam et al. .......... | 709/217 |
| 6,026,371 A * | 2/2000 | Beck et al. ..................... | 705/14 |
| 6,049,796 A * | 4/2000 | Siitonen et al. ................. | 707/3 |
| 6,097,797 A * | 8/2000 | Oseto ..................... | 379/100.08 |
| 6,108,691 A * | 8/2000 | Lee et al. ..................... | 709/206 |
| 6,125,369 A * | 9/2000 | Wu et al. ..................... | 707/201 |
| 6,154,783 A * | 11/2000 | Gilmour et al. ............. | 709/245 |
| 6,230,188 B1 * | 5/2001 | Marcus ........................ | 709/206 |
| 6,292,211 B1 * | 9/2001 | Pena ........................ | 348/14.08 |
| 6,298,128 B1 * | 10/2001 | Ramey et al. ........... | 379/142.01 |
| 6,430,405 B1 * | 8/2002 | Jambhekar et al. .......... | 455/403 |
| 6,707,472 B1 * | 3/2004 | Grauman ..................... | 715/752 |
| 6,874,023 B1 * | 3/2005 | Pennell et al. ............... | 709/224 |
| 6,897,985 B1 * | 5/2005 | Toyoda ........................ | 358/402 |
| 6,909,708 B1 * | 6/2005 | Krishnaswamy et al. .... | 370/352 |

(Continued)

FOREIGN PATENT DOCUMENTS

EP    1136917 A2    9/2001

(Continued)

OTHER PUBLICATIONS http://people.yahoo.com, pp. 1 and 2, Aug. 2, 1999.*

*Primary Examiner*—Haresh N Patel
(74) *Attorney, Agent, or Firm*—Craig A. Fieschko, Esq.; DeWitt Ross & Stevens S.C.

(57) ABSTRACT

A method of and system for generating a set of standardized electronic mail addresses, provide a personal name code indicative of the name of a person, a location code indicative of a known location of the person, generate an electronic mail address for said person based on the personal name code and the location code and provide a database of said electronic mail addresses for a plurality of persons at one or more locations. The preferred embodiment allows electronic mail addresses to be constructed and indexed so as to provide the easy location by a combination of some or all of family name, forenames, district, telephone area code, and for attachment of any amount of information relating to that address.

13 Claims, 3 Drawing Sheets

E-MAIL INDEX SEARCH RESULTS

| Search Criterion | |
|---|---|
| Title | Mr. |
| First Name | A |
| Surname | Dean |
| Town/City | |
| Postal Code | |
| Telephone Area Code | 01234 |
| Telephone Number | 123* |
| Search Results | |
| Index Details | |
| Mr. Alan D Dean<br>Tall Trees<br>Hergya Hyll<br>Orsett, Essex<br>RM16 3JA<br>01234 123456<br>alan.derek.dean.RM163JA.0@index.com<br>alan.dean@freeuk.com | |

U.S. PATENT DOCUMENTS

| | | | |
|---|---|---|---|
| 2001/0034609 A1* | 10/2001 | Dovolis | 705/1 |
| 2001/0037265 A1* | 11/2001 | Kleinberg | 705/27 |
| 2001/0047391 A1* | 11/2001 | Szutu | 709/206 |
| 2003/0120737 A1* | 6/2003 | Lytle et al. | 709/206 |
| 2005/0125546 A1* | 6/2005 | Pennell et al. | 709/227 |
| 2006/0184453 A1* | 8/2006 | Taylor | 705/51 |
| 2006/0184504 A1* | 8/2006 | Taylor | 707/1 |

FOREIGN PATENT DOCUMENTS

| | | |
|---|---|---|
| GB | 2365566 A | 2/2002 |
| JP | 6261069 | 9/1994 |
| WO | WO99/40527 | 8/1999 |

* cited by examiner

E-MAIL INDEX SEARCH TOOL

| Title | Mr. ▼ |
|---|---|
| First Name | A |
| Surname | Dean |
| Town/City |  |
| Postal Code | RM16 ▼ |
| Telephone Area Code | 01234 ▼ |
| Telephone Number | 123 |
|  | SEARCH |

*Fig. 1*

E-MAIL INDEX SEARCH RESULTS

| Search Criterion | |
|---|---|
| Title | Mr. |
| First Name | A |
| Surname | Dean |
| Town/City | |
| Postal Code | |
| Telephone Area Code | 01234 |
| Telephone Number | 123* |
| Search Results | |
| Index Details | |
| Mr. Alan D Dean<br>Tall Trees<br>Hergya Hyll<br>Orsett, Essex<br>RM16 3JA<br>01234 123456<br>alan.derek.dean.RM163JA.0@index.com<br>alan.dean@freeuk.com | |

*Fig.2*

STANDARDIZED EMAIL CONSTRUCTION AND SEARCH BASED ON GEOGRAPHIC LOCATION

CROSS-REFERENCE TO RELATED APPLICATIONS

This application claims the benefit of co-pending U.K. Patent Application No. 0007224.9 filed on Mar. 24, 2000.

FIELD OF THE INVENTION

The present invention relates to a system and method of creating a standardised set of electronic mail addresses.

BACKGROUND OF THE INVENTION

The lack of an efficient and convenient system to locate an unknown electronic mail address is a major factor affecting the convenience and efficiency of electronic communication.

Electronic mail addresses can range from descriptive and easy to recall addresses that are based on a person's name or profession, to complex addresses that are difficult for people to remember or locate by simple rules.

No pattern or standard has been set for the structure of electronic mail addresses which would allow easy indexing and location by people wanting to find an individual's electronic mail address.

This is in marked contrast to the world's telephonic systems, where the number (address) is allocated centrally according to a national pattern. The referencing information attached to this telephone number is also collected in a uniform way. This standardisation allows indexing by district or name and address and can be made available to potential users of the telephonic system in a variety of convenient ways.

SUMMARY OF THE PRESENT INVENTION

The present invention seeks to provide a standardised system for structuring electronic mail addresses so as to make them uniform.

According to an aspect of the present invention, there is provided a method of generating a set of standardised electronic mail addresses, including providing a personal name code indicative of the name of a person, providing a location code indicative of a known location of the person, generating an electronic mail address for said person based on said personal name code and said location code, and providing a database of said electronic mail addresses for a plurality of persons at one or more locations.

According to another aspect of the present invention, there is provided a system for generating a set of standardised electronic mail addresses, including means for providing a personal name code indicative of the name of a person, means for providing a location code indicative of a known location of the person, address generation means operable to generate an electronic mail address for said person based on said personal name code and said location code, and database creation means operable to provide a database of said electronic mail addresses for a plurality of persons at one or more locations.

In particular, for commercial, trade, service or professional requirements this allows the production of a directory of electronic mail addresses.

The location code could be, for example, a postal or area code, a telephone area code and so on. The personal name code preferably includes at least a person's family name.

The preferred embodiment allows electronic mail addresses to be constructed and indexed so as to provide the easy location by a combination of some or all of family name, forenames, district, telephone area code, and for attachment of any amount of information relating to that address.

To attain this goal, one or more structured addresses are created for each individual in a country, geographic region or state to which any number of subsidiary addresses can be attached, including existing electronic mail addresses. It is a simple matter for the system to be used to associate any of the structured electronic mail addresses with one or several other addresses to allow for routing of electronic mail messages to and from a designated master address.

The information that can be utilised for this purpose includes family name, forename(s), postal (zip) code (or country specific address locator code system) or portion thereof, as well as telephone area code (or region specific portion of telephone number). In rare instances, other identifiers may be required for purposes of uniqueness; however, these can be easily added automatically. The order must be a standardised format but it is irrelevant which format is originally chosen.

The preferred embodiment provides for the creation of a set of electronic mail addresses in standard format and which can enable a user to identify through simple logical analysis the electronic mail address of a known person residing at a known location, without needing to know that person's chosen electronic mail address. The system could also provide for a user to enter a person's name and location code, such as postal or telephone area code into the system, with the electronic mail address being identified by the system itself rather than by the user.

Thus, the preferred embodiment has the advantage of being able to offer a standard method of addressing electronic mail messages to persons for whom personal details are known but for whom an electronic mail address is not known. These addresses can be published nationally or locally or can be assumed depending on the amount of personal details that are known.

In one embodiment, the structured electronic mail addresses once created would be suitable to distribution on a CD-ROM/s with a simple software program to search for an individual's electronic mail address or addresses. The service could also be provided on line or in paper form.

DESCRIPTION OF THE DRAWINGS

An embodiment of the present invention is described below, by way of example only, with reference to the accompanying drawings, in which:

FIG. 1 is a schematic diagram of the preferred embodiment of search facility;

FIG. 2 is a schematic diagram of the preferred embodiment of results display.

DESCRIPTION OF THE PREFERRED EMBODIMENT

Figure 3:
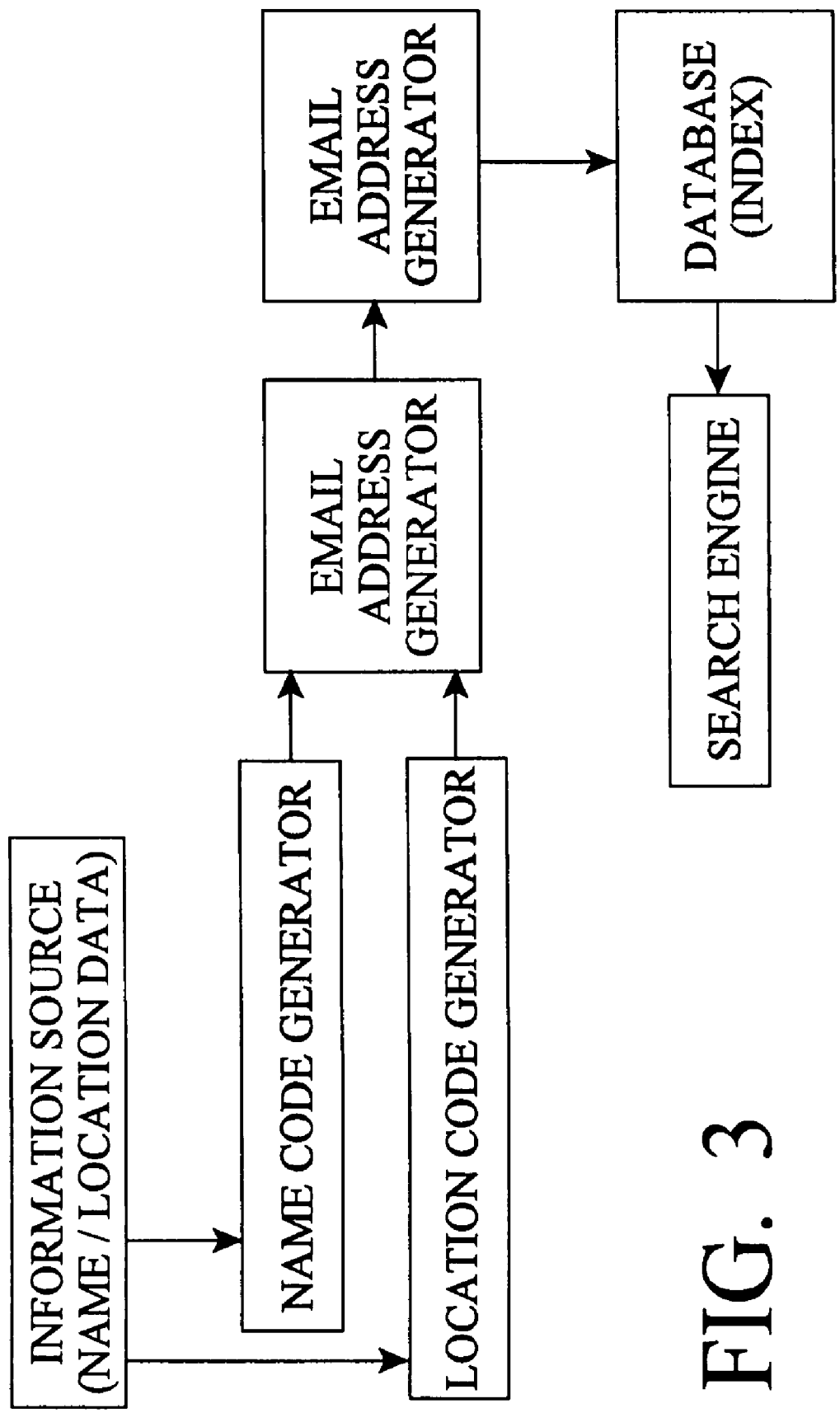
FIG. 3 is a schematic diagram of the preferred embodiment of electronic address creation system.

The described embodiment is directed to the current form of electronic mail addresses but could equally be applied to other electronic or virtual addresses which could be developed in the future.

The preferred embodiment combines individual details into an index system to allow generation of structured electronic mail addresses and to allow easy searching of those details or a combination of those details to enable the location of individuals.

The individuals' details will be collected from generally available sources of information or entered from details submitted and an index of these individuals created from it, along with electronic mail addresses constructed from these details. The indexed information can be updated and added to by individuals who wish to have a more complete record of their personal details in the index.

All items of individual information will be added to the index where they are available but partial index entries will also be created, although electronic mail addresses may not be generated if the information is insufficient to do so. It is envisaged that the creation of the indexing system could be carried out automatically by accessing a database of physical addresses and associating one or more of the elements of the physical addresses or locations with the personal details of the person or persons at that location. The apparatus required to perform this operation will be readily apparent to the skilled person from the teachings of the general principles disclosed herein.

The major usage for the master index created will be as a real time search system that can function as a stand-alone computer based application, an on-line electronic service or in a printed form. It is envisaged that this master index and electronic mail address location system can be provided on-line such that users can access the information provided while using the Internet.

Index Creation

The details that are incorporated into the index system may include some or all of the following, but is not limited thereto:
  Individual Name
    Family Name
    Forenames
  Geographic Location
    Locator 1
    Locator 2
    Locator 3
    Locator 4
  Postal Code (or Country specific address locator code system)
  Telephone Number
  Telephone Area Code (or Country specific address locator code system)
  Non-unique indicator The indexed information has the following attributes that feature in the above example index structure.

Individual's Name

The full name of the individual will be recorded including title, family or surname, forenames or initials as available.

Geographical Location

A country or region specific list of locations will be used to select the geographical details that are indexed. This list in turn will be used to facilitate searching of the index of individuals' details. The address information from the individual's details will be stored in three index items, 'locator 1', 'locator 2', 'locator 3' and 'locator 4'.

Postal Code (or Country Specific Address Locator Code System)

The postal code of the individual will be added to the index of individuals' details. All postal codes that are used in the process of generating the information index will be recorded in a form that will facilitate searching of the individuals' details index.

Telephone Number

The primary telephone number of the individual will be added to the index.

Telephone Area Code (or Region Specific Portion of Telephone Number)

The telephone area code of the business will be added to the index of individuals' details. All telephone area codes that are used in the process of generating the information index will be recorded in a form that will facilitate searching of the individuals' details index.

Non-unique Indicator

The majority of index entries will be unique due to the index construction, in the instance of an index entry not being unique an additional numeric indicator will be added to the index record.

The Index Format

An example of a master index record for an individual is as follows:
  Individual's information as presented:
    Alan D Dean
    Tall Trees
    Herga Hyll
    Orsett
    Essex
    RM16 3JA The individual's information would be entered into the index as follows:

| Index Item | Detail |
| --- | --- |
| Individual Name | Mr. Alan D Dean |
| Geographical Location | |
| Locator 1 | Orsett |
| Locator 2 | Essex |
| Locator 3 | |
| Locator 4 | UK |
| Postal Code | RM16 3JA |
| Telephone Number | 123456 |
| Telephone Area Code | 01234 |
| Non-unique indicator | 0 |
| Generated electronic mail addresses (where ******* represents the electronic address there the structured electronic mail addresses would operate) | alan.d.dean.rm163ja@******* alan.dean.01234@******* |

Searching the Index

Once created, the index can be searched either electronically or manually to locate an individual by using any one of the following criteria or combination of criteria:
  Individual's Name or part thereof
  Geographical Location
  Postal Code
  Telephone Number
  Telephone Area Code Matching one or more of these fields gives a user of the index a means of narrowing down a search rapidly to present the index entries that match their requirements.

EXAMPLE OF USE OF THE PREFERRED EMBODIMENT

A person wishing to locate the electronic mail address for an individual, can use the index to locate the information they need, for example:

A user wishes to locate the electronic mail address for an individual with a specified family name who resides in the geographical region known as Essex. Manually, the user may search the index to locate individuals listed as residing in Essex.

Alternatively, an electronic search tool could be offered to facilitate searching, which would have an appearance similar to FIG. 1.

Following the input of one or more criteria a results screen would be displayed listing all individuals for whom matching information could be located in the index.

An example of how this information might be presented is given in FIG. 2.

In summary, the preferred embodiment provides a system for correlating the details of individuals with a standardised method of communicating with those individuals via electronic means. This will enable users to locate individuals by personal details and physical location and then carry out communications electronically.

I claim:

1. A program storage device readable by a machine and encoding a program of instructions for generating and providing access to standardized electronic mail addresses for individuals in a geographic region, the program of instructions comprising:
   a. instructions collecting name and known location data of an individual from an information source;
   b. instructions creating an at least partial entry for the individual in an index of individuals in a database, the at least partial entry being created once the name data and the known location data of the individual are collected;
   c. instructions triggering generation of a standardized electronic mail address for the individual once both the name data and the known location data have been collected wherein:
      (1) the name data includes at least a family name of the individual, and
      (2) the location data includes one or more of
         (a) a country specific postal address locator code,
         (b) a region specific portion of a telephone number, the instructions including:
            i. instructions generating a personal name code indicative of the collected name data of the individual;
            ii. instructions generating a location code indicative of the collected known location data of the individual; and
            iii. instructions generating the standardized electronic mail address for the individual based on the personal name code and the location code,
      wherein one or more standardized email addresses are automatically created for each individual in a country, geographic region or state without each individual providing name and known location data to the program storage device;
   d. instructions submitting the standardized electronic mail address for the individual to the database; and
   e. instructions searching the database using the personal name code and the location code for the individual to locate the standardized electronic mail address of the individual.

2. The program storage device according to claim 1, wherein one or more subsidiary addresses, including existing electronic addresses, are associated with the standardized electronic mail address of the individual in the database.

3. The program storage device according to claim 1, wherein the instructions are further operable to attach a unique numeric identifier to the standardized electronic mail address of the individual.

4. The program storage device according to claim 1, wherein the instructions are further operable to provide the database of standardized electronic mail addresses on-line.

5. The program storage device according to claim 4, wherein the instructions are further operable to locate the standardized electronic mail address of the individual in the database.

6. The program storage device according to claim 1, wherein the instructions are further operable to:
   determine whether the standardized electronic mail address generated for the individual based on the personal name code and the location code is non-unique, and
   wherein upon determining that the standardized electronic mail address generated is non-unique, generating the standardized electronic mail address for the individual by attaching a unique numeric indicator to the standardized electronic mail address.

7. A system for generating and providing access to standardized electronic mail addresses for individuals in a geographical region, the system comprising:
   a. one or more computers configured to:
      (1) collect name and known location data of an individual from an information source;
      (2) create an at least partial entry for the individual in an index of individuals in a database, the at least partial entry being created once the name data and the known location data of the individual are collected;
      (3) generate a standardized electronic mail address for the individual once both the name and the known location data have been collected wherein:
         (a) the name data includes at least a family name of the individual, and
         (b) the known location data includes one or more of
            (i) a country specific postal address locator code,
            (ii) a region specific portion of a telephone number, the standardized electronic mail address including:
               i. a personal name code indicative of the name data of the individual, the personal name code including the family name of the individual;
               ii. a location code indicative of the known location data of the individual; and
            wherein the standardized electronic mail address for the individual is based on the personal name code and the location code;
         and wherein one or more standardized email addresses are automatically created for each individual in a country, geographic region or state associated with the individual, without the individual providing name and known location data to the system;
      (4) submit the standardized electronic mail address for the individual to the database; and
   b. a computer including a search engine for searching the database using the personal name code and the location code to locate the standardized electronic mail address associated with the individual.

8. The system according to claim 7, wherein the one or more computers are also configured to associate one or more subsidiary addresses, including existing electronic addresses, with the standardized electronic mail address of the individual in the database.

9. The system according to claim 7, wherein the one or more computers are also configured to attach a unique numeric identifier to the standardized electronic mail address of the individual.

10. The system of claim 7, wherein the one or more computers provide the database of standardized electronic mail addresses on-line.

11. The system of claim 10, wherein the one or more computers locate the standardized electronic mail address of the individual in the database.

12. The system of claim 7, wherein the one or more computers also:
    a. determine whether the standardized electronic mail address generated for the individual based on the personal name code and the location code is non-unique, and
    b. upon determining that the standardized electronic mail address generated is non-unique, generate the standardized electronic mail address for the individual by attaching an unique numeric indicator to the standardized electronic mail address.

13. A method for generating and providing access to standardized electronic mail addresses for individuals in a geographical region, the method comprising one or more computers:
    a. collecting name data and location data of an individual from one or more preexisting databases;
    b. creating an at least partial entry for the individual in an index of individuals in an index database, the at least partial entry being created once any name data and location data of the individual are collected from the one or more preexisting databases;
    c. generating a standardized electronic mail address for the individual after the at least partial entry for the individual has been created in the index, wherein:
        (1) the standardized electronic mail address is generated once:
            (a) the collected name data includes at least a family name of the individual, and
            (b) the collected location data includes one or more of
                (i) a country specific postal address locator code,
                (ii) a region specific portion of a telephone number,
        (2) the standardized electronic mail address includes:
            (a) a personal name field, the personal name portion including at least the family name for the individual;
            (b) a location field, the location portion including at least a portion of the collected location data for the individual;
        wherein one or more standardized email addresses are automatically created for each individual in a country, geographic region or state associated with the individual, without the individual providing name and known location data to the computers;
    d. storing the standardized electronic mail address in the index database in association with the corresponding name data and location data for the individual;
    e. accepting search queries from users, the search queries including one or more of:
        (1) name data, and
        (2) location data, and
    f. returning search results to the users, the search results including one or more standardized electronic mail addresses corresponding to one or more of the name data and location data accepted in the user search queries.

* * * * *